Sept. 29, 1964    H. G. CONWAY ETAL    3,150,849
NOSE-WHEEL UNDER-CARRIAGE APPARATUS FOR AIRCRAFT
Filed Feb. 19, 1963    2 Sheets-Sheet 1

3,150,849
NOSE-WHEEL UNDER-CARRIAGE APPARATUS FOR AIRCRAFT
Hugh Graham Conway, Crawfordsburn, County Down, and Malcolm Keith Bowden, Belfast, Northern Ireland, assignors to Short Brothers & Harland Limited, Belfast, Northern Ireland, a British company
Filed Feb. 19, 1963, Ser. No. 259,491
Claims priority, application Great Britain, Feb. 22, 1962, 7,014/62
5 Claims. (Cl. 244—100)

The invention is concerned with nose-wheel under-carriage apparatus for aircraft, e.g. cargo aircraft, of the kind in which the fore part of the fuselage forms a door capable of being swung about a vertical axis, together with the nose-wheel under-carriage mounted on the underside of said fore part, to expose the full cross-section of the hold compartment, for the purpose of loading or unloading. It is an object of this invention to provide means in such aircraft for avoiding the difficulty of obtaining a satisfactory register of the mating portions of the fuselage nose and after-portion, which results from structural deflections arising from variations in the static load on the nose-wheel under-carriage. Further disadvantages arising from these varying conditions are the excessive hinge loads on the nose-portion and the considerable variation in sill height at the loading doorway throughout the loading or unloading operation.

The invention provides in an aircraft of the aforesaid kind, in combination with a rigid strut for the after-part of the fuselage structure upon which the nose-portion together with the nose-wheel under-carriage are pivotally mounted, means in the under-carriage unit whereby the reactive force exerted by the telescopic element thereof may be controllably maintained at a value which does not substantially exceed that required to support the mass of the swinging structure. Said means may consist of apparatus whereby, when the rigid strut element is braced to support the load of the after-part of the fuselage, the reactive characteristic of said telescopic element is automatically adjusted to provide the modified conditions above referred to.

Figure 1:
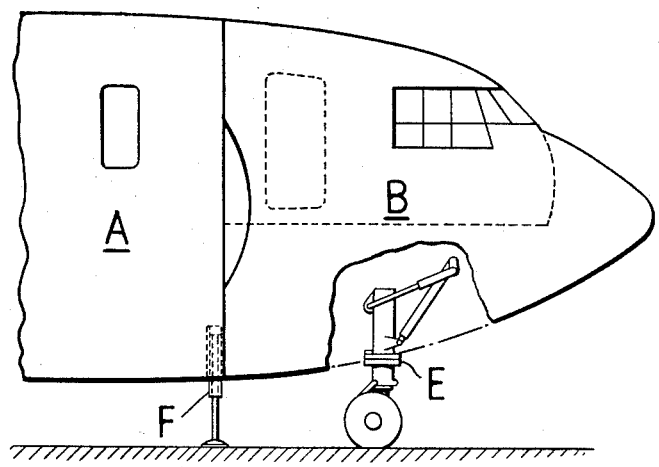
Figure 2:
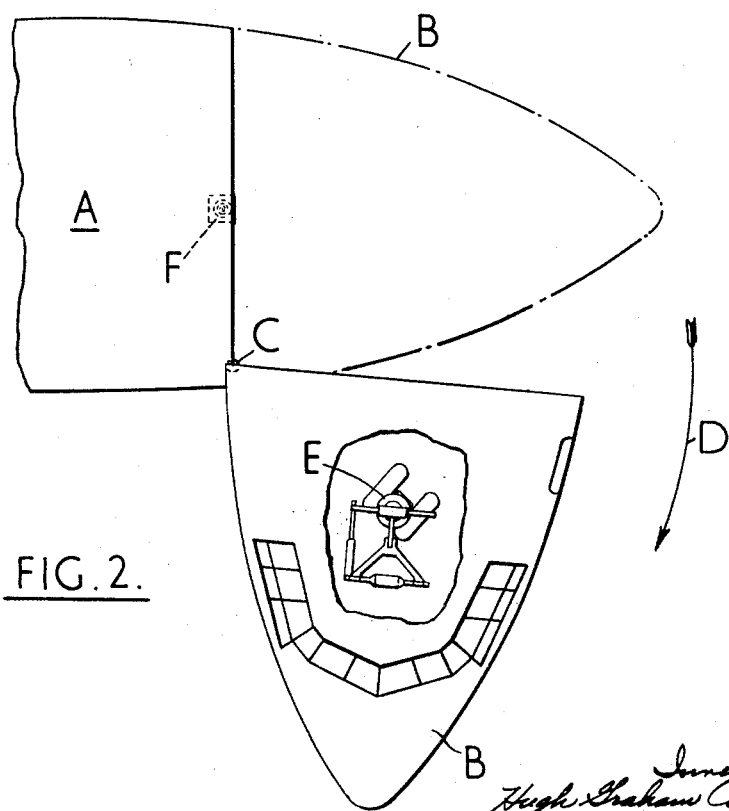
Figure 3:
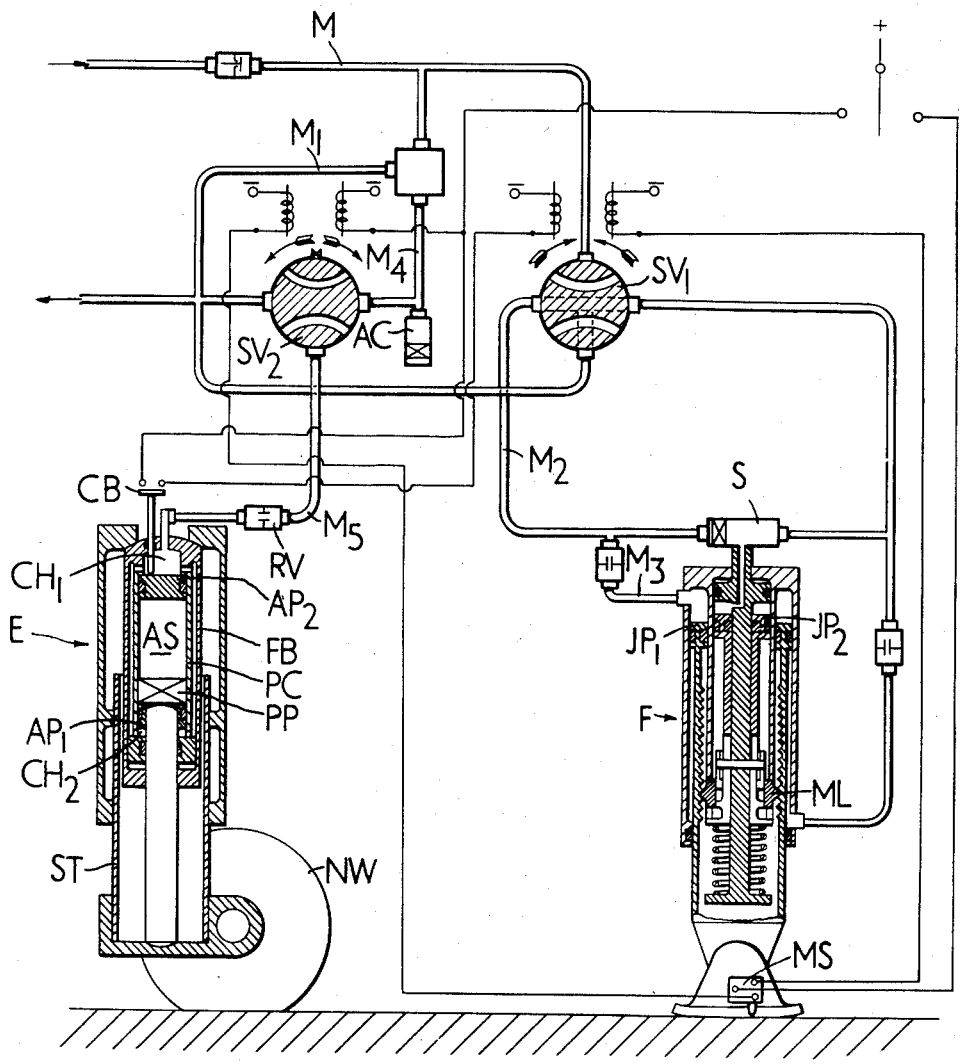

The manner in which the invention may be carried into effect is hereinafter described with reference to the accompanying drawings, in which FIG. 1 is a side elevation of the fore part of an aircraft incorporating this invention, and FIG. 2 is a plan thereof, part of the nose portion in both figures being cut away to reveal the nose-wheel undercarriage. FIG. 3 is a diagrammatic representation of the nose-wheel under-carriage and the rigid strut, illustrating their several hydraulic circuits and connections.

As will be seen from FIGS. 1 and 2, the aircraft has a fuselage A, the fore part B of which is hingedly connected thereto at C, so as to be capable, when unlocked, of being swung about the vertical axis of the hinges in the direction of the arrow D into the position shown in FIG. 2 in which the full cross-section of the hold compartment within the after part of the fuselage A is exposed and rendered accessible without obstruction for ease of loading or unloading through the open end of the fuselage A. The hinged nose-portion B carries upon its underside the nose-wheel under-carriage E, and a rigid telescopic strut F is mounted beneath the leading edge of the after part of the fuselage A, and said strut F being capable of retraction within the fuselage part A during flight.

When the aircraft is at rest, and it is desired to open the nose of the fuselage as shown in FIG. 2, said strut F is first extended to its operative position and there locked, supporting the fuselage A rigidly at a constant height above the ground level, or in relation to the threshold of a loading dock or the like.

Reference FIG. 3 shows that the nose-wheel under-carriage E includes a conventional oleo-pneumatic shock-absorber, comprising an inner pneumatic cylinder PC, which is enclosed within a fixed barrel FB defining an annular passage extending between hydraulic chambers $CH_1$ and $CH^2$ respectively at upper and lower ends of the pneumatic cylinder. Beneath the pneumatic piston PP, which moves with the sliding tube ST associated with the nose-wheel NW, is a free auxiliary piston $AP_1$, and a second auxiliary piston $AP_2$ is fixed in the upper part of the cylinder PC in operative relationship to the chamber $CH_1$. Both auxiliary pistons $AP_1$ and $AP_2$ are arranged to be energized by a subsidiary hydraulic fluid supply from the main M, fluid for the piston $AP_1$ passing from the chamber $CH_1$ on the pressure side of the piston $AP_2$ to the chamber $CH_2$ beneath the piston $AP_1$. The pressure of said subsidiary hydraulic supply is maintained at a sensibly constant value by a reducing valve RV.

When the strut F is locked in its extended position, hydraulic pressure is applied to the auxiliary pistons $AP_1$ and $AP_2$. The first effect, due to the operation of the piston $AP_1$, is to retract the sliding tube assembly and to relieve ground reaction. Thereafter this reaction is reduced by an increase in hydraulic pressure to a value below the desired final value at which the pneumatic and hydraulic forces acting upon the piston $AP_1$ are in hydrostatic balance. A further increase in the hydraulic pressure operates the piston $AP_2$, causing the sliding tube ST assembly to be extended so as to apply an artificial ground reaction which is a unique function of the hydraulic pressure and which may accordingly be determined by controlling said pressure so that the hinges C are relieved of external loads.

When the strut F is not in use, the piston $AP_2$ is maintained in an inoperative position by the pneumatic pressure in the inner cylinder PC and the piston $AP_1$ is withdrawn out of engagement with the sliding tube assembly, being provided with a certain free stroke for this purpose. Thus, the auxiliary pistons $AP_1$ and $AP_2$ have no part in the normal operation of the shock absorber, the integrity of which is unaffected by a failure in the subsidiary hydraulic system provided by this invention.

The manner in which the apparatus may be used will be understood by reference to FIG. 3. Assuming the nose-portion door B to be closed, the sequence of operations which must be performed when it is desired to load or unload the freight hold is as follows:

The right-hand selector valve SV1 is rotated electrically to its extreme anti-clockwise position to allow hydraulic pressure to be supplied from the main M through the branch M2 to the shuttle valve S and by the branch M3 to the upper face of the outer piston JP1 of the strut F. The valve S opens to admit pressure to the central piston JP2, thereby disengaging the mechanical lock ML and permitting the strut to extend into its operative position, as shown.

When the strut F makes contact with the ground a micro-switch MS is closed, interrupting the electrical supply to the selector valve SV1, which accordingly resumes its central or neutral position, so that the pressure in the branch M2 being again discontinued the mechanical lock ML is re-engaged and the strut F becomes rigid to support its load. Simultaneously, the left-hand selector valve SV2 is energised electrically and rotated to its extreme anti-clockwise position, connecting the branch M4 from the main M to the branch M5 and thereby applying pressure to the auxiliary pistons $AP_1$ and $AP_2$ of the nose-wheel under-carriage E first moving the piston $AP_1$ so as to close the nose-wheel shock absorber, permitting the nose-wheel tyres to extend, since the aircraft height is held constant by the strut F, and reducing the ground reaction on the under-carriage E until the pressure in the branch M5 reaches the value required to just balance the piston $AP_2$ against the air spring within the chamber AS.

Further increase in pressure moves the piston $AP_2$ downwardly to compress the air spring AS, and the ground reaction, being now simply equal to the load due to the hydraulic circuit pressure acting on the differential areas of the pistons $AP_1$ and $AP_2$, begins again to increase, moving the lower piston $AP_1$ down slightly to compensate for the compression of the tyres as the ground reaction increases.

At a predetermined pressure corresponding to the desired ground reaction the operations are complete, and will be automatically terminated by the reducing valve RV, which is set to the appropriate pressure. A signal made by suitable means (not shown) will indicate to the operator that this stage has been reached, and if the two selector valves SV1 and SV2 are now left in their neutral positions, pressure in the auxiliary hydraulic circuit of th nose-wheel under-carriage E will be maintained by the accumulator AC. It is now possible to open the swinging nose-part of the fuselage.

The reverse procedure is as follows:

After closing the nose-part of the fuselage, the selector valve SV2 is energised to move into its extreme clockwise position, releasing the pressure in the nose-wheel under-carriage auxiliary hydraulic circuit, and permitting the nose-wheel under-carriage to resume its original condition, whereby the upper piston $AP_2$ closes the circuit-breaker CB of the selector valve SV1.

The selector valve SV1 is now energised to assume its extreme clockwise position, admitting hydraulic pressure to the strut mechanical lock piston JP2 and to the lower side of the strut piston JP1. The mechanical lock ML is disengaged and the strut is retracted.

If all electrical circuits are now interrupted both selector valves SV1 and SV2 move to their neutral positions, the strut mechanical lock ML is re-engaged, leaving the aircraft ready for flight, with the strut F stowed and the nose-wheel undercarriage shock absorber free to execute its normal functions.

What we claim as our invention and desire to secure by Letters Patent is:

1. In an aircraft wherein the fore part of the fuselage is mounted for hinging movement about a vertical axis and having a nose-wheel under-carriage mounted on the underside of said hinging fore part, the combination therewith of a retractable rigid strut carried on the fixed after part of the fuselage, means for extending said strut to an operative position, means in said strut for locking the same in extended condition, and means in the undercarriage assembly operative when the rigid strut is extended to its operative condition for automatically adjusting the reactive force exerted thereby to a value not substantially exceeding that required to support the mass of the hinged structure.

2. Apparatus as claimed in claim 1, wherein the nose-wheel under-carriage includes an oleo-pneumatic shock-absorber unit and wherein said adjustment is effected by the regulation of a subsidiary hydraulic fluid supply connected to the hydraulic component of said strut.

3. Apparatus as claimed in claim 2, wherein the rigid strut carried on the after part of the fuselage incorporates a hydraulically operated telescopic retraction mechanism, and means for operatively connecting said mechanism with said subsidiary hydraulic fluid supply at the times desired.

4. Apparatus as claimed in claim 2, wherein the nose-wheel under-carriage shock-absorber comprises an inner pneumatic cylinder enclosed within a co-axial fixed barrel defining an annular passage between chambers respectively at the opposite ends of the pneumatic cylinder, a pneumatic piston operating in said cylinder and arranged to move with the nose-wheel a free auxiliary piston in the chamber at the lower end of the cylinder, and a second auxiliary piston fixed in the upper end of the cylinder to react pressure in the adjacent chamber, means for connecting a subsidiary hydraulic pressurised fluid supply to said chambers, the arrangement being such that the effect of pressurising said auxiliary pistons is to relieve the load on the shock absorber unit due to ground reaction and to substitute therefor an artificial load sufficient to relieve the external loads on the hinges of the fore part of the fuselage.

5. In an aircraft wherein the fore part of the fuselage is mounted for hinging movement about a vertical axis and having a nose-wheel under-carriage mounted on the underside of said hinging fore part, the combination therewith of a retractable rigid strut carried on the fixed after part of the fuselage, means for extending said strut to an operative position, means in said strut for locking the same in extended condition, means in the undercarriage assembly for automatically adjusting the reactive force exerted thereby to a value not substantially exceeding that required to support the mass of the hinged structure; the nose-wheel undercarriage including an oleo-pneumatic shock-absorber, the shock-absorber comprising an inner pneumatic cylinder enclosed within a co-axial fixed barrel defining an annular passage between chambers respectively at the opposite ends of the pneumatic cylinder, a pneumatic piston operating in said cylinder and arranged to move with the nose-wheel a free auxiliary piston in the chamber at the lower end of the cylinder, and a second auxiliary piston fixed in the upper end of the cylinder to react pressure in the adjacent chamber, said reactive force adjustment being effected by the regulation of a subsidiary hydraulic fluid supply, means for connecting said subsidiary hydraulic pressurized fluid supply to said chambers, and to hydraulically actuate extending and retracting means in said strut, the arrangement being such that the effect of pressurizing said auxiliary pistons is to relieve the load on the shock absorber unit due to ground reaction and to substitute therefore an artificial load sufficient to relieve the external loads on the hinges of the fore part of the fuselage.

References Cited in the file of this patent
UNITED STATES PATENTS

| | | |
|---|---|---|
| 2,519,522 | Wells | Aug. 22, 1950 |
| 3,009,672 | Tharratt | Nov. 21, 1961 |
| 3,051,419 | Weiland et al. | Aug. 28, 1962 |